United States Patent
Hill

(10) Patent No.: US 11,961,119 B2
(45) Date of Patent: *Apr. 16, 2024

(54) ARCHIVE OFFER PERSONALIZATION

(71) Applicant: Scribd, Inc., San Francisco, CA (US)

(72) Inventor: James August Hill, San Francisco, CA (US)

(73) Assignee: Scribd, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,132

(22) Filed: Jul. 25, 2022

(65) Prior Publication Data

US 2022/0358540 A1 Nov. 10, 2022

Related U.S. Application Data

(63) Continuation of application No. 17/176,171, filed on Feb. 15, 2021, now Pat. No. 11,475,482.

(51) Int. Cl.
| | |
|---|---|
| G06Q 30/02 | (2023.01) |
| G06F 16/953 | (2019.01) |
| G06N 5/01 | (2023.01) |
| G06N 20/00 | (2019.01) |
| G06Q 30/0251 | (2023.01) |

(52) U.S. Cl.
CPC ....... G06Q 30/0254 (2013.01); G06F 16/953 (2019.01); G06N 5/01 (2023.01); G06N 20/00 (2019.01)

(58) Field of Classification Search
CPC .......... G06Q 30/0224; G06Q 30/0251; G06Q 30/0254; G06Q 30/0253; G06N 20/00; G06N 5/003; G06F 16/953

USPC .................... 705/14.25, 14.49, 14.52, 14.53
See application file for complete search history.

(56) References Cited

U.S. PATENT DOCUMENTS

| | | | |
|---|---|---|---|
| 5,634,012 A | 5/1997 | Stefik | |
| 11,531,915 B2 * | 12/2022 | Hetherington | ......... G06N 5/025 |
| 2008/0168515 A1 | 7/2008 | Benson | |
| 2013/0263230 A1 | 10/2013 | Gorodyansky | |

(Continued)

OTHER PUBLICATIONS

Frank, E., Wang, Y., Inglis, S. et al. Using Model Trees for Classification. Machine Learning 32, 63-76 (1998), retrieved from SpringerLink [online] at https://link.springer.com/article/10.1023/A:1007421302149 on May 1, 2023, https://doi.org/10.1023/A:1007421302149 (Year: 1998).*

(Continued)

*Primary Examiner* — Scott D Gartland
(74) *Attorney, Agent, or Firm* — Cognition IP, P.C.; Edward Steakley; Rajesh Fotedar

(57) ABSTRACT

Various embodiments of an apparatus, method(s), system(s) and a computer program product(s) described herein are directed to a Offer Engine. The Offer Engine extracts one or more features from data associated with a first user requesting access to a portion of content of a content corpus. The Offer Engine feeds at least one of the features of the first user into a decision tree. The decision tree has multiple levels, wherein at least one level comprises a plurality of leaves and each respective leaf implements at least one machine learning model. The Offer Engine determines whether to provide the first user with a subscription fee offer first option or a non-subscription fee offer second option based at least in part on output of the decision tree.

17 Claims, 8 Drawing Sheets

(56) References Cited

U.S. PATENT DOCUMENTS

| | | |
|---|---|---|
| 2016/0253688 A1 | 9/2016 | Nielson |
| 2018/0191827 A1 | 7/2018 | Kistler |
| 2019/0095785 A1 | 3/2019 | Sarkar |
| 2019/0297376 A1 | 9/2019 | McCarty |
| 2021/0303934 A1* | 9/2021 | Ernest ................. G06N 3/08 |
| 2022/0198281 A1* | 6/2022 | Van Lunteren ... G06F 16/90339 |
| 2022/0230203 A1* | 7/2022 | Liu ................. G06F 18/24323 |

OTHER PUBLICATIONS

Gupta, Prashant, Decision Trees in Machine Learning, Towards Data Science [online], dated May 17, 2017, downloaded Aug. 19, 2023 from https://towardsdatascience.com/decision-trees-in-machine-learning-641b9c4e8052 (Year: 2017).*

Heuer, Jacey, XGBoost is Machine Learning's Captain America, dated Nov. 25, 2019, downloaded https://opendatascience.com/xgboost-is-machine-learnings-captain-america/ on Apr. 13, 2021 (Year: 2019).

Ray, Sunil, Commonly used Machine Learning Algorithms (with Python and R codes), dated Sep. 9, 2017, downloaded from https://www.analyticsvidhya.com/blog/2017/09/common-machine-learning-algorithms/ on Apr. 13, 2021 (Year: 2017).

Foote, Keith D., A Brief History of Machine Learning, dated Mar. 26, 2019, downloaded from https://www.dataversity.neU a-brief-history-of-machine-learning/# on Apr. 13, 2021 (Year: 2019).

Decision tree learning, from Wikipedia, dated Feb. 10, 2021, and downloaded from https://en.wikipedia.org/w/index.php?title=Decision_tree_learning&oldid=1006056844 (Year: 2021).

Decision Tree, from Wikipedia, dated Feb. 12, 2021, and downloaded from https://en.wikipedia.org/w/index.php?title=Decision_tree&oldid=1006356001 (Year: 2021).

Loh, Wei-Yin, Fifty Years of Classification and Regression Trees, International Statistics Review, dated 2014, pp. 329-348 (Year: 2014).

* cited by examiner

ARCHIVE OFFER PERSONALIZATION

CROSS-REFERENCE TO RELATED APPLICATIONS

This application is a continuation of U.S. patent application Ser. No. 17/176,171, filed on Feb. 15, 2021, the entirety of which is incorporated herein by reference.

BACKGROUND

In the field of computer science, artificial intelligence ("A.I.") networks, such as neural networks and deep learning networks, are increasingly being employed to solve a variety of tasks and challenging problems. Such A.I. networks can consist of layers of computational graphs with nodes representing computational operations and connections in between those operations and/or computational graphs with filters representing the extraction of features from input data. Each operation computes or extracts something from the input data and/or previous layer in order to produce output data and/or next layer. Within A.I. networks there are fairly predefined operations, and there can be, e.g., hundreds or thousands of these operations. Such operations can represent such computational tasks as matrix multiplication and convolution, often using many pieces of input data from within the network.

SUMMARY

Conventional systems exist that allow for detecting various characteristics and attributes of users accessing an online resource. However, such conventional systems fail to consider and account for predicted user behaviors in response to how the conventional systems decide to interact with those respective users. Various embodiments of an apparatus, method(s), system(s) and a computer program product(s) described herein are directed to an Offer Engine. The Offer Engine provides many advantages over conventional systems with regard to managing the trade-off between the effect(s) on subsequent user traffic as a result from attempting to convert users into respective users who pay a subscription fee and the effect(s) on subsequent user traffic resulting from requesting uploaded content from those users—in place of subscription fee revenue—in exchange for granting access to the certain content.

According to various embodiments, the Offer Engine extracts one or more features from data associated with a first user requesting access to a portion of content of a content corpus. The Offer Engine feeds at least one of the features of the first user into a decision tree. The decision tree has multiple levels, wherein at least one level comprises a plurality of leaves and each respective leaf implements at least one machine learning model. The Offer Engine determines whether to provide the first user with a subscription fee offer first option or a non-subscription fee offer second option based at least in part on output of the decision tree. Based on the determination, the Offer Engine sends an offer option notification to the first user.

In some embodiments, the content corpus may represent a digital library that includes, for example, respective portions of digital books (i.e. eBooks), digital academic papers, audiobook files, and/or digital magazine articles. The digital library may further be a component(s) of an open publishing platform that implements the Offer Engine.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

According to various embodiments, a first level of the decision tree may have one or more first level leaves for determining a lifetime value personalization segment for a respective user. A second level of the decision tree may have one or more second level leaves. A machine learning model(s) for determining the respective user's subscription probability rate is implemented at each second level leaf. For example, the second level may itself be a decision tree machine learning model trained on data specific to determining respective users' subscription probabilities.

A third level of the decision tree may have one or more third level leaves. A machine learning model(s) for determining the respective user's content upload probability rate is implemented at each third level leaf. For example, the third level may itself also be a decision tree machine learning model trained on data specific to determining respective users' content upload probabilities.

According to various embodiments, the Offer Engine feeds output of the decision tree into at least one objective function. An objective function calculates whether to provide a respective user the subscription fee offer first option or the non-subscription fee offer second option based at least in part on that user's subscription probability rate and content upload probability rate. According to various embodiments, an offer first option may be limited to a subscription offer. In various embodiments, an offer first option may be an offer to provide a requesting user access to content in the content corpus in exchange for the requesting user completing a certain type of recommended purchase, transaction and/or any type of user action.

According to various embodiments, a non-subscription fee offer second option is an offer to provide a respective user access to a portion of content of the content corpus in exchange for receipt of an upload of additional content from that respective user to the content corpus.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
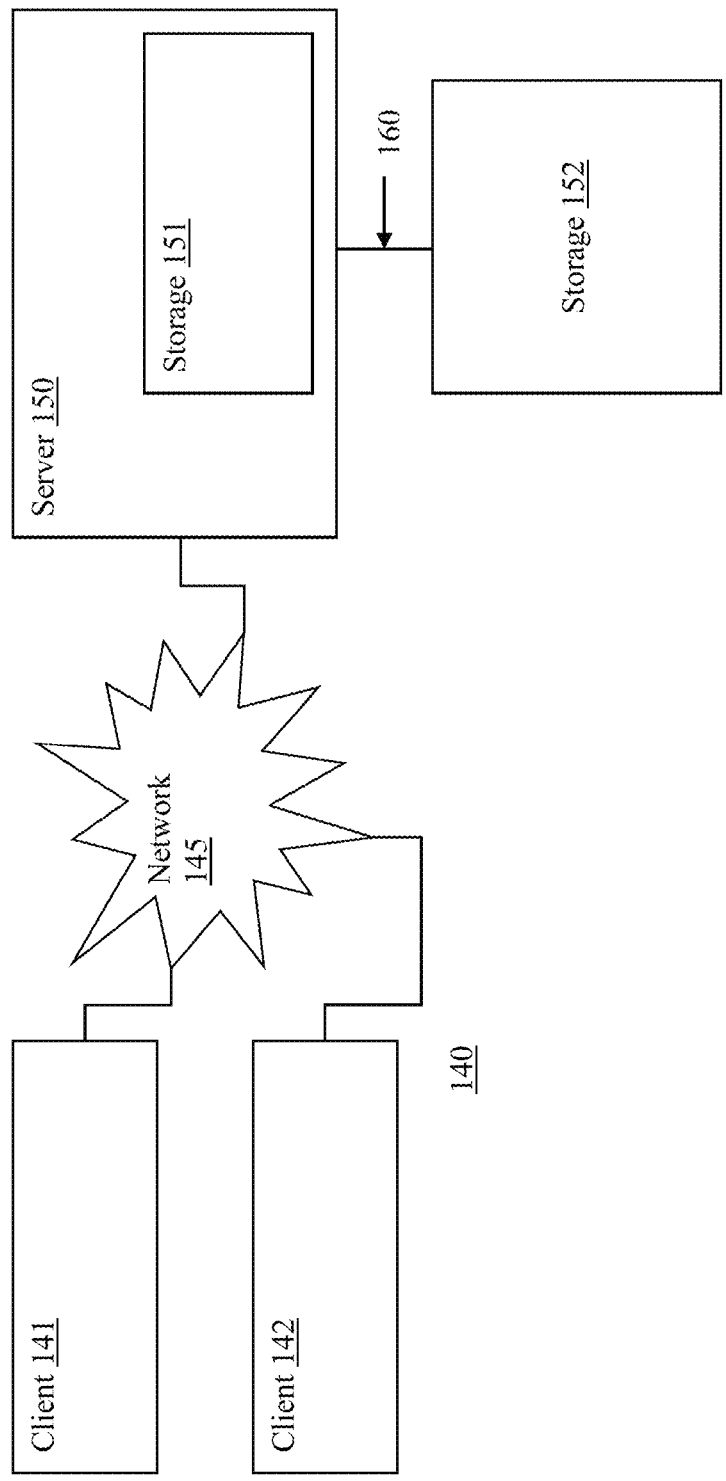
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the various embodiments described herein. The various embodiments described herein may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
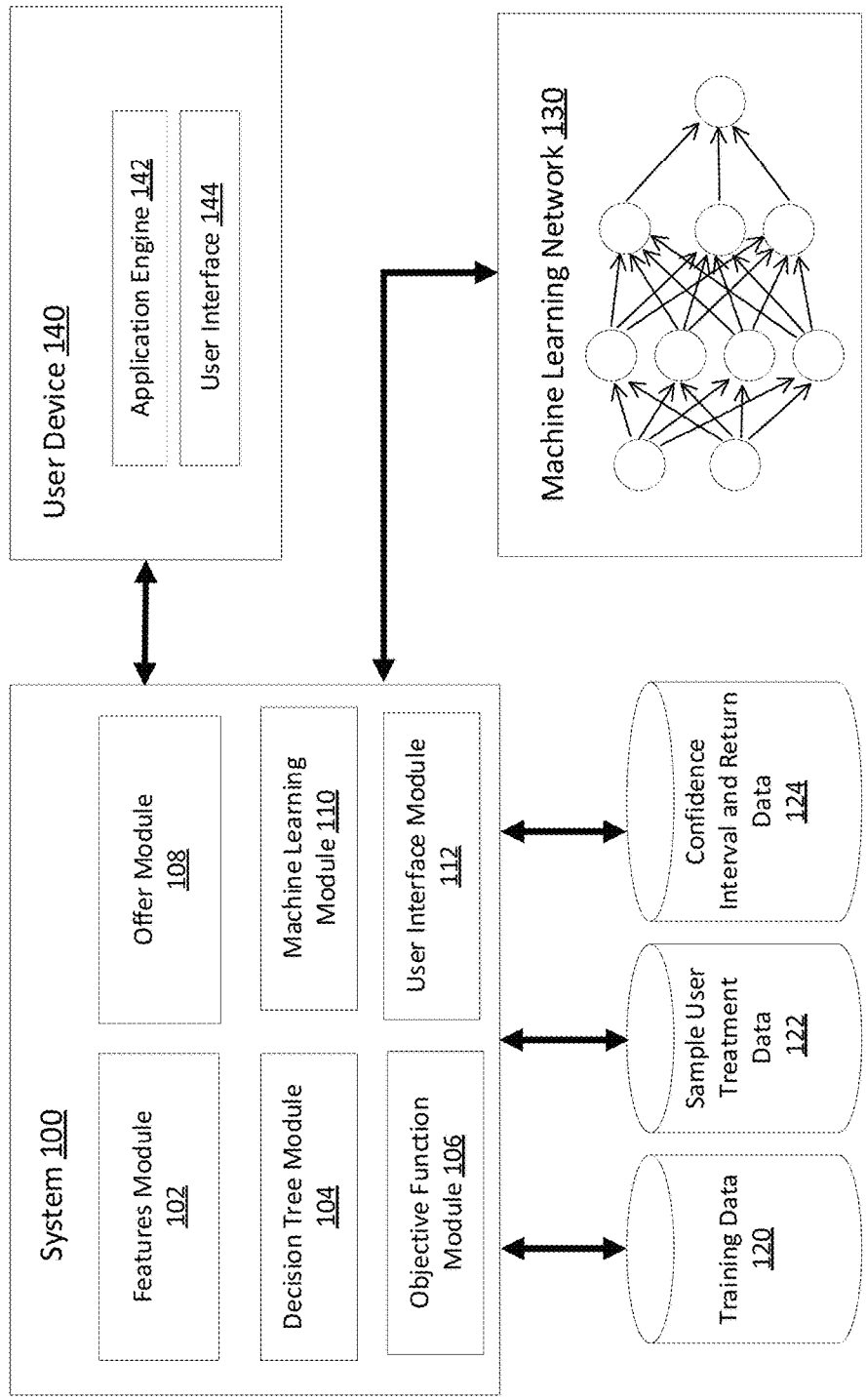
FIG. 1B is a diagram illustrating an exemplary environment in which some embodiments may operate.

FIG. 1B illustrates a block diagram of an example system 100 for an Offer Engine that includes a features module 102, a decision tree module 104, an objective function module 106, an offer module 108, a machine learning module 110, and a user interface (U.I.) module 112. The system 100 may communicate with a user device 140 to display output, via a user interface 144 generated by an application engine 142. It is understood that any of the modules 102, 14, 106, 108, 110, 112 may be implemented in a distributed manner.

The features module 102 of the system 100 may perform functionality associated with features as illustrated in FIGS. 2-6.

The decision tree module 104 of the system 100 may perform functionality associated with a decision tree and decision tree file as illustrated in FIGS. 2-6.

The objective function module 106 of the system 100 may perform functionality associated with an objective function (s) as illustrated in FIGS. 2-6.

The offer module 108 of the system 100 may perform functionality associated with one or more types of offer options as illustrated in FIGS. 2-6.

The machine learning module 110 of the system 100 may perform functionality associated with training and/or implementing a machine learning model(s) as illustrated in FIGS. 2-6.

The user interface (U.I.) module 112 of the system 100 may perform functionality associated with displaying any type of data related to any operations, acts, functions, calculations, features and data as illustrated in FIGS. 2-6.

The system 100 may include and/or communicate with one or more databases 120, 122, 124. A database 120 may include machine learning network training data. A database 122 may include data related to a uniform distribution of treatment of one or more user segments. A database 124 may include data for determining and/or calculating one or more confidence intervals and various probabilities of return. While the databases 120, 122 and 124 are displayed separately, the databases and information maintained in a database may be combined together or further separated in a manner the promotes retrieval and storage efficiency and/or data security.

Figure 2:
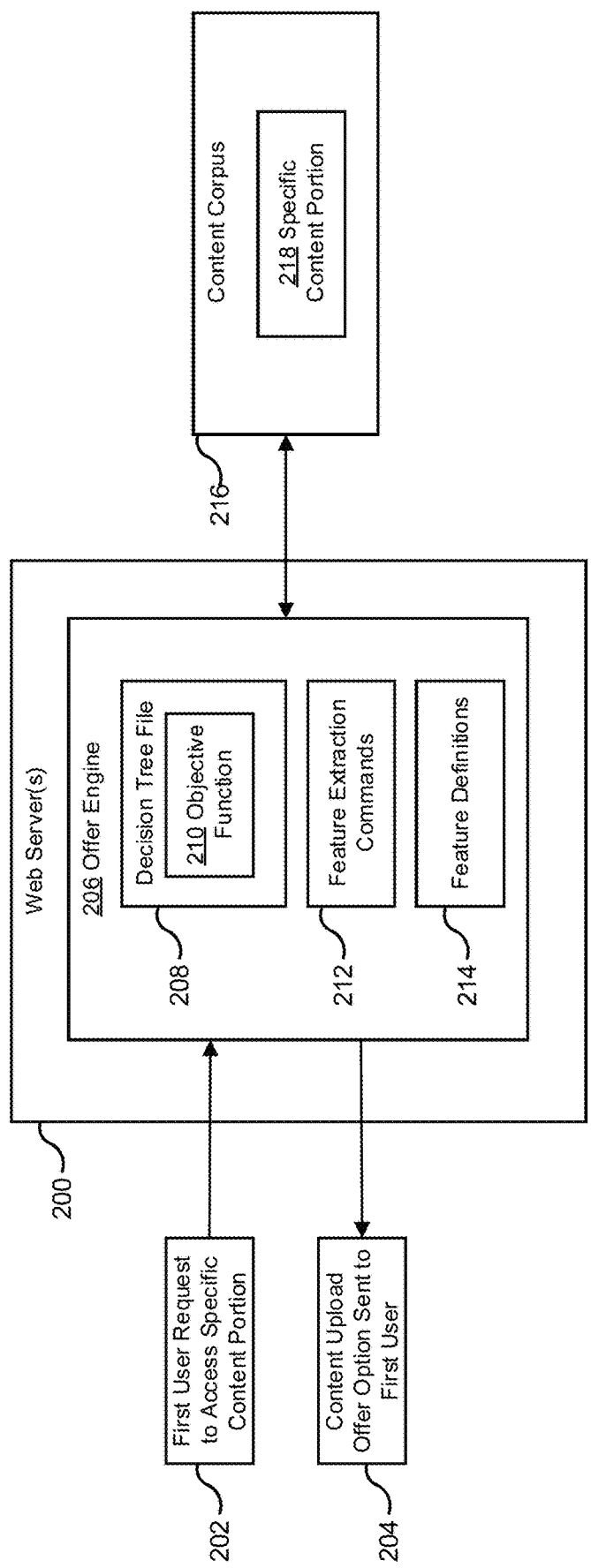
FIG. 2 is a diagram illustrating an exemplary environment in which some embodiments may operate.

As shown in FIG. 2, a decision tree may be implemented by an Offer Engine 206 executing at a web server(s) 200 according to a representation of the decision tree in a decision tree file 208. The decision tree file 208 further includes an objective function 210 for determining a type of offer option to be presented to a first user in response to a request 202 to access a specific content portion 218 of a content corpus 216. For example, a first offer option may be offering to provide the first user access to the specific content portion 218 in exchange for the first user's payment of a subscription fee. A second offer option may be offering to provide the first user access to the specific content portion 218 in exchange for the first user uploading content to the content corpus 218. It is understood that various embodiments of the Offer Engine 206 may be implemented via a cloud computing system(s).

The Offer Engine 206 further includes feature extraction commands 212 and feature definitions 214. For example, one or more features may be required as input into one or more machine learning models implemented within the decision tree. The feature extraction commands 212 provide commands for extracting values from data associated with the first user (and any other user), wherein the extracted values may correspond to one or more features defined in the feature definitions 214. The feature extraction commands 212 may further include rules, instructions and/or commands for generating input data for the decision tree based at least in part on extracted features.

Upon extracting and/or generating features input data from data associated with the first user, the Offer Engine 206 feeds the extracted features input data into the decision tree. The Offer Engine 206 feeds output generated from the decision tree into an objective function 210. The objective function 210 may return a first result indicating the second offer option is to be presented to the first user. The Offer Engine 206 sends a notification 204 to the first user, wherein the notification 204 presents the second offer option to the first user. If the first user selects the presented second offer option via a selectable functionality, the Offer Engine 206 provides the first user with access to the requested specific content portion 218 upon receipt of uploaded additional content sent by the first user. Upon receipt of the additional content, the Offer Engine 206 integrates the additional content into a content corpus 216. In various embodiments, a notification may include a selectable shortcut button for accessing a functionality for uploading content. In various embodiments, a notification may include a selectable shortcut button for initiating a transaction with the open publishing platform, such as, applying for a subscription and/or completing a purchase transaction and or completing any type of user action.

Figure 3:
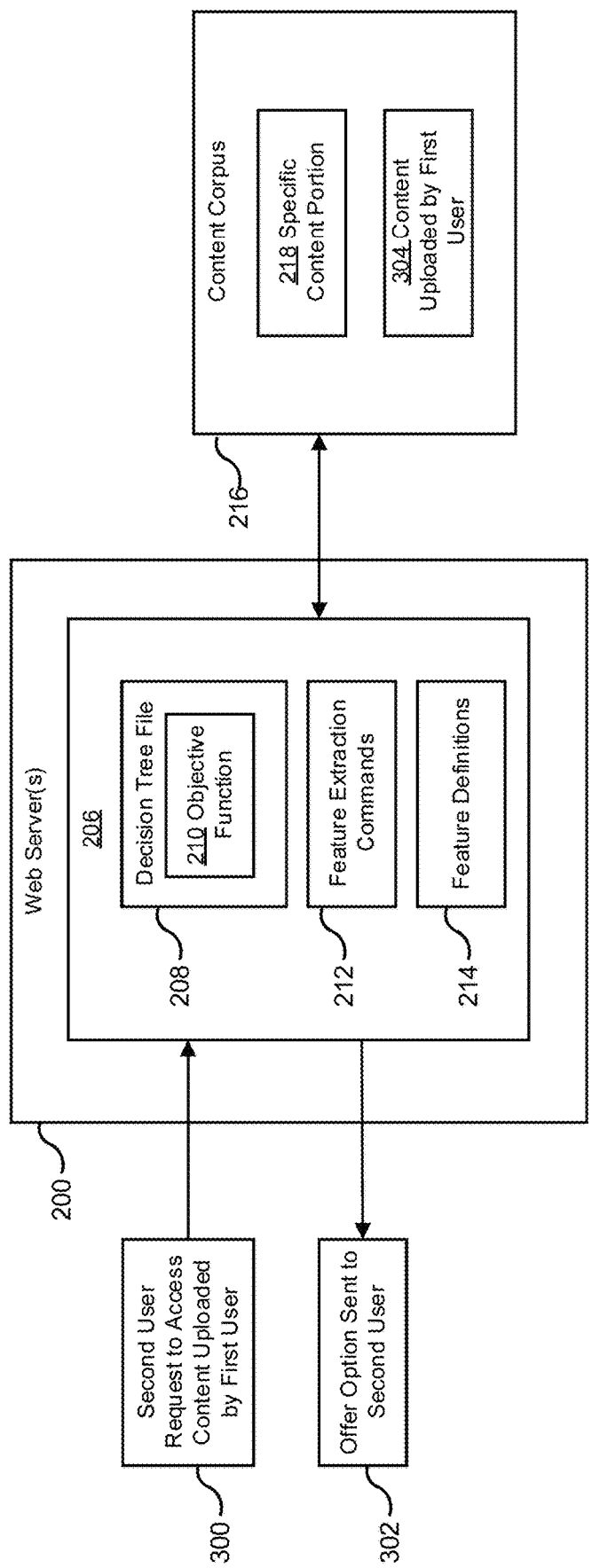
FIG. 3 is a diagram illustrating an exemplary environment in which some embodiments may operate.

As shown in FIG. 3, the Offer Engine may receive a subsequent request 300 from a second user. For example, the request 300 from the second user may be a request to access the additional content 304 uploaded by the first user that is integrated into the content corpus 216. For example, the subsequent request 300 from the second user may be associated with a selection of a search result provided to the second user by a remote search engine. The search result selected by the second user may provide an identification of the additional content 304 uploaded by the first user that is currently integrated as part of the content corpus 216.

The Offer Engine 206 extracts features from data associated with the second user and the decision tree generates output that the Offer Engine feeds 206 into the objective function 210. The objective function 210 may return a result indicating that the first offer option or the second offer option is to be presented to the second user. The Offer Engine 206 sends a notification 302 to the second user, wherein the notification 302 presents an offer option to the second user whereby the Offer Engine 206 grants the second user access to the first user's uploaded content 304 in exchange for the second user also providing content to be uploaded into the content corpus 216. If the second user selects the presented offer option via a selectable functionality provided via the Offer Engine 206, the Offer Engine 206 provides the second user with access to the additional content 304 upon determining that the second user has satisfied one or more requirements of the presented offer option 302.

Figure 4:
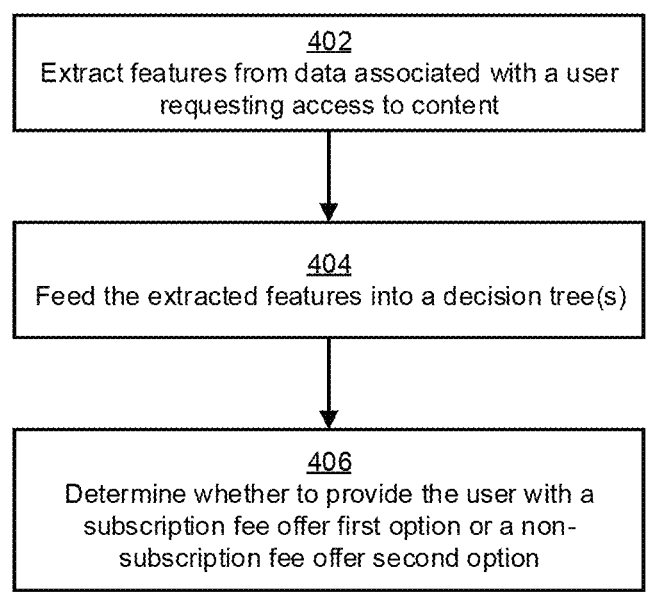
FIG. 4 is a diagram illustrating an exemplary method that may be performed in some embodiments.

As shown in flowchart 400 of FIG. 4, the Offer Engine extracts one or more features from data associated with a first user requesting access to a portion of content of a content corpus (Act 402). According to various embodiments, the Offer Engine may upload a decision tree file to a web server(s) and one or more instructions for extracting features from data related to respective users accessing the web server(s). In addition, the Offer Engine may upload a definition file to the web server(s) that includes definitions for various types of features to be input into various types of machine learning models implemented at respective leaves of the decision tree. For example, the one or more features may have respective definitions based on a device of the first user, the content the first user seeks to access, a browser used by the first user, and/or a physical geographical location related to the first user.

The Offer Engine feeds the extracted features of the first user into the decision tree. (Act 404). In various embodiments, the decision tree comprises multiple levels. For example, a first level may include one or more first level leaves for determining a lifetime value personalization segment for a respective user. A second level may include one or more second level leaves where each second level leaf implements a machine learning model(s) for determining the respective user's subscription probability rate. A third level may include one or more third level leaves where each third level leaf implements a machine learning model(s) for determining the respective user's content upload probability rate. It is understood that various embodiments of the decision tree are not limited to having three levels. Rather, the decision tree may be implemented as having any number of levels, whereby each leaf at any of the levels may implement one or more different types of machine learning models.

The Offer Engine determines whether to provide the first user with a subscription fee offer first option or a non-subscription fee offer second option based at least in part on output of the decision tree. (Act 406) The Offer Engine feeds output of the decision tree into an objective function(s). The objective function calculates whether to provide the first user the subscription fee offer first option or the non-subscription fee offer second option based at least in part on the first user's subscription probability rate and the first user's content upload probability rate.

Figure 5:
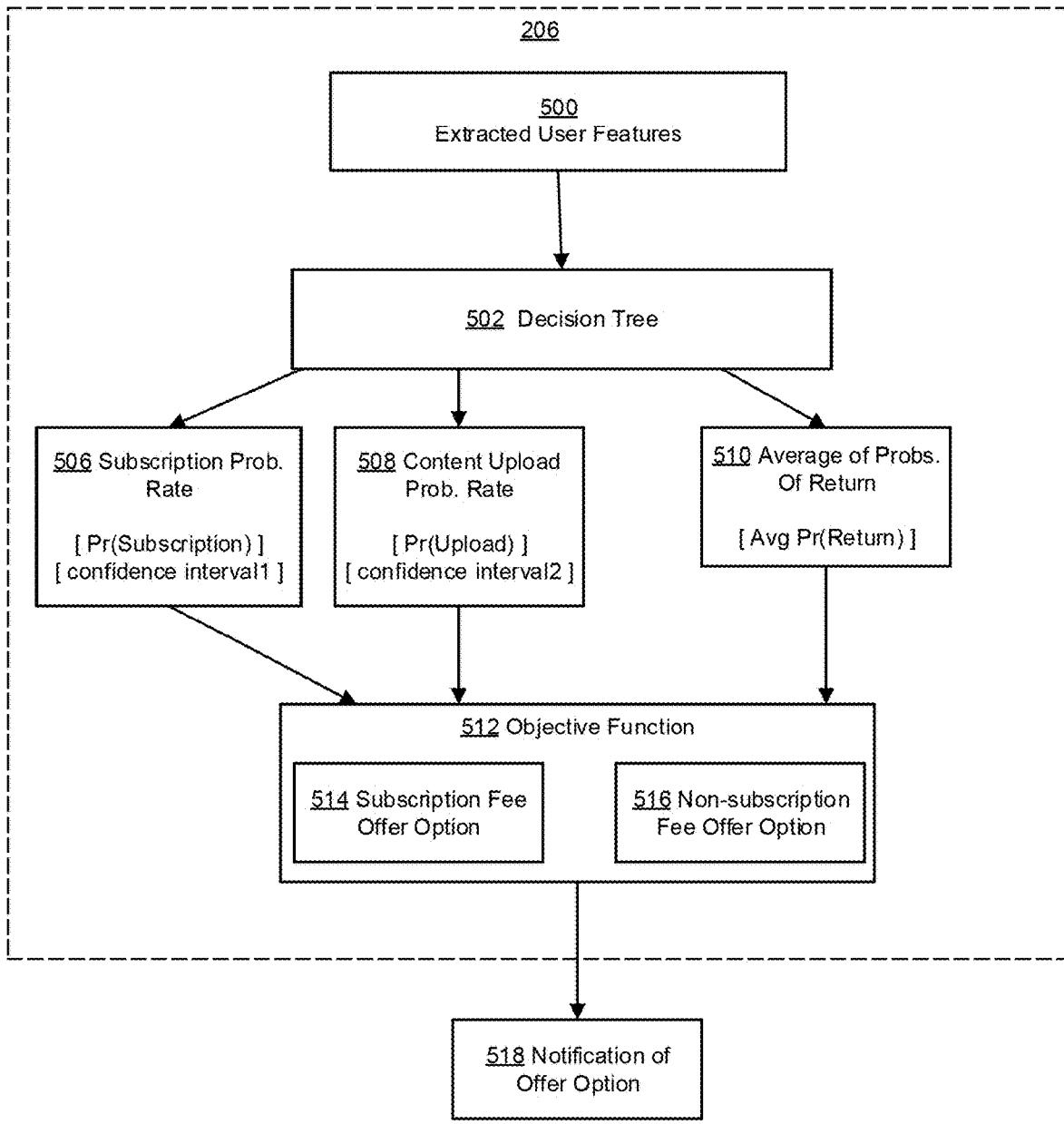
FIG. 5 is a diagram illustrating an exemplary environment in which some embodiments may operate.

As shown in FIG. 5, various embodiments described herein manage the trade-off between the subsequent effects from attempts to convert users into users who pay a subscription fee and attempts to request uploaded content from users in place of seeking subscription fee revenue from those users. The uploaded content can be added by the Offer Engine to a content corpus that itself (i.e. the uploaded user content) can be used to attract additional users.

According to various embodiments, the Offer Engine feeds extracted user features 500 into a decision tree 502. The Offer Engine executes an objective function(s) 512 in order to determine whether to offer a first offer option 514 for the user to sign up to pay a subscription fee or to offer a second non-subscription offer option 516.

According to various embodiments, the second non-subscription offer option 516 may be an offer to allow the user to access specific content in exchange for the user uploading additional content. For example, the second non-subscription offer option 516 may require the user to upload a certain defined amount of content in order to access the specific content which is currently available in the content corpus. In various embodiments, different amounts of uploaded content may be required of different users seeking access to the content corpus. For example, if a first user and then a subsequent second user both send requests to access particular content in the content corpus and the Offer Engine determines that both the first and second users are to be notified 518 with the second non-subscription offer options 516, the Offer Engine may dynamically determine a different amount of content that is to be uploaded by each of the first and second users in order to be granted access to the same desired particular content.

According to various embodiments, the Offer Engine computes a probability of subscription 506 and a probability of upload 508 (i.e. content upload probability rate) for a user via the decision tree 502. In addition, the Offer Engine further calculates a first probability of return for the user associated with the subscription probability 506 and a second probability of return for the user associated with the upload probability 508. The Offer Engine calculates an average 510 of the first and second probabilities of return. In some embodiments, a probability of return for a respective user represents a probability that a user will revisit the open publishing platform that implements the Offer Engine.

The Offer Engine inserts the probability of subscription 506, the probability of upload 508, and the average probability of return into the objective function(s) 512 in order to generate output indicating whether to offer the user the first offer option 514 to pay the subscription fee or to offer the user the second non-subscription offer option 516 that requests content to be uploaded by the user.

According to various embodiments, each machine learning model implemented at a leaf is trained according to a uniform distribution of treatments, whereby a treatment represents a determined type of offer option presented to a user sample in a particular user segment. Further, the Offer Engine calculates a confidence interval for each leaf based on its uniform distribution of treatments. A leaf's confidence interval indicates an expected range of a value output resulting from the leaf's calculations.

According to various embodiments, when a probability of subscription 506 is determined at a respective second level leaf, the probability of subscription 506 is output in association with a confidence interval for that respective second level leaf. The confidence interval represents an accuracy of the output probability of subscription 506.

Similarly, when a probability of upload 508 is determined at a respective third level leaf, the probability of upload 508 is output in association with a confidence interval for that respective third level leaf. The confidence interval represents an accuracy of the output probability of upload 508 as well. The Offer Engine receives as input for the objective function 512: the subscription and upload probabilities 506, 508, the associated confidence intervals and the average 510 the first and second probabilities of return.

Figure 6:
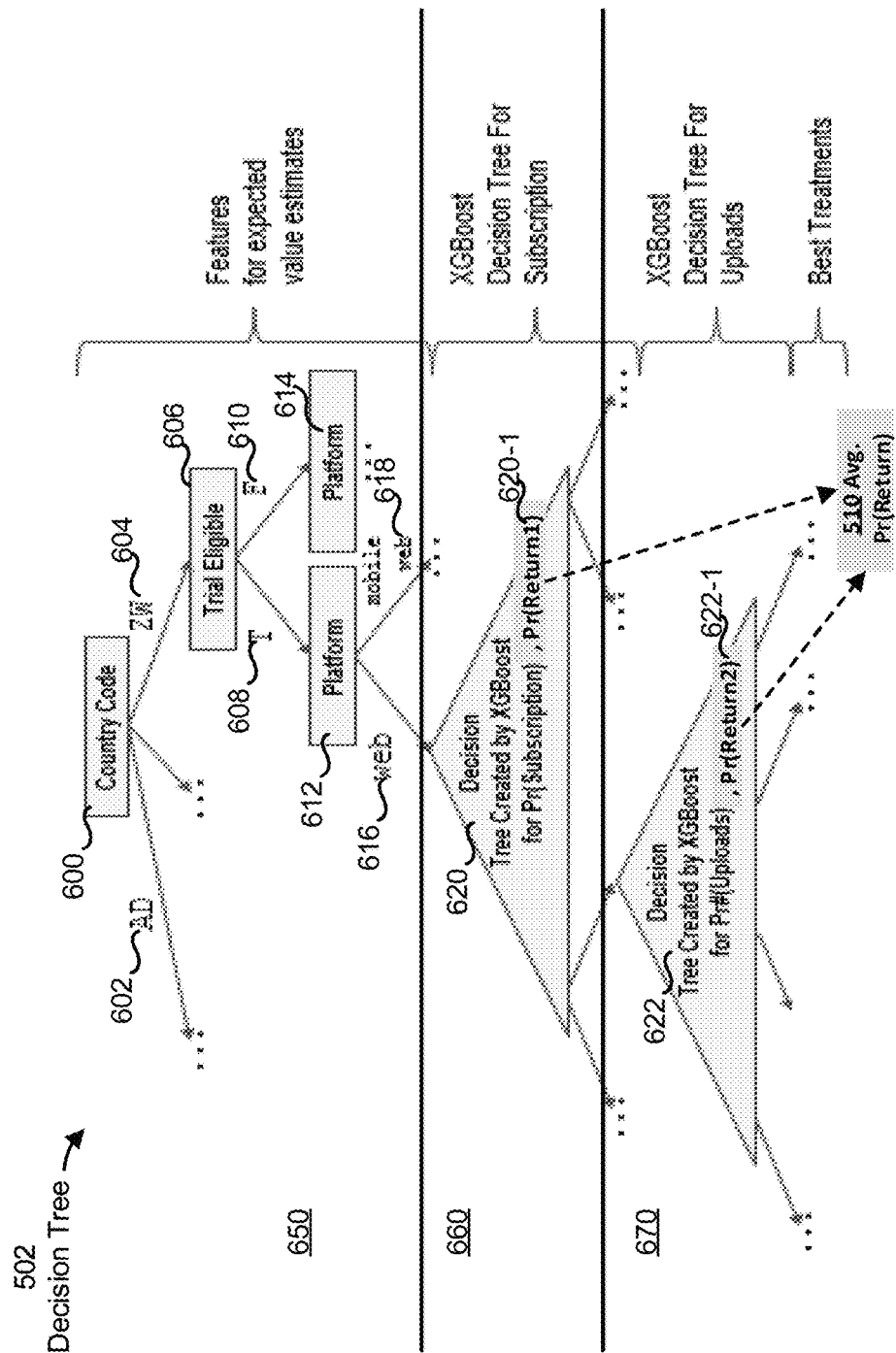
FIG. 6 is a diagram illustrating an exemplary environment in which some embodiments may operate.

As shown in FIG. 6, according to various embodiments, the Offer Engine trains and implements one or more machine learning models for a decision tree 502 in order to calculate probabilities of subscription, content upload and return for a respective user(s). The decision tree 502 may have multiple levels 650, 660, 670. The decision tree 502 has a first level 650 for determining a lifetime value personalization segment associated with a respective user. For example, a leaf 600 of the first level 650 evaluates a country code feature associated with data of a user. Based on a determined country code output 602, 604, a subsequent leaf 606 of the first level 650 may be accessed. The subsequent leaf 606 may evaluate a trial eligibility feature associated with data of the user. Based on the determined trial eligibility (true 608, false 610) of the user, another subsequent leaf 612, 614 of the first level 650 may then be accessed. Each of these subsequent leaves 612, 614 may evaluate a platform feature associated with data of the user.

For example, if the user qualifies as eligible for a trial membership (true 608), the next subsequent leaf 612 of the first level 650 may evaluate a user feature(s) to determine whether the user is seeking to access the content corpus from a non-mobile device 616 (such as a laptop computer) or a mobile device 618. Upon identifying that the user's request was not sent from a mobile device, the first level 650 analysis of the decision tree 502 is complete and a customer segment for that user is therefore determined by the path traveled through the respective leaves (600, 606, 612) in the first level 650.

The decision tree 502 has a second level 660 for predicting the respective user's subscription rate on a per-user segment basis. According to various embodiments, the subscription rate represents a probability that a respective user of a particular user segment will be converted to a paying customer who pays a subscription fee. It is understood that the decision tree 502 routes data about the user to a particular leaf in the second level 660 that corresponds to the user segment of that user. For example, the decision tree 502 routes a result from analyzing the user's features data at the first level 650 to a particular leaf 620 on the second level 660. In various embodiments, a machine learning model implemented by a particular leaf 620 may be an XGBoost Decision Tree that returns a probability of subscription and a probability of return 620-1 for a respective user. The probability of return 620-1 represents a likelihood the respective user will return to access the content corpus as a result of being offered a subscription offer option.

It is understood that the second level 660 of the decision tree 502 includes multiple leaves, wherein each respective leaf implements a machine learning model(s). In some embodiments, each respective leaf at the second level may include the same machine learning model(s). For example, each second level leaf may be an XGBoost Decision Tree trained on data related to a different user segment. Each respective leaf of the second level 660 may implement a machine learning model(s) for a different user segment as represented by a particular path through leaves of the first level 650 for determining a user's lifetime value personalization segment.

The decision tree 502 has a third level 670 for predicting the respective user's upload rate (i.e. content upload probability rate). According to various embodiments, the upload rate represents a probability that a respective user of a particular user segment will upload content, or a certain amount of content, that can be added to the content corpus.

The third level 670 of the decision tree 502 for predicting the upload rate also includes multiple leaves, wherein each respective leaf implements a machine learning model(s) for a different user segment.

For example, the decision tree 502 routes machine learning output from a second level leaf 620 to a third level leaf 622 that corresponds to the same user segment as the second level leaf 620. In various embodiments, a machine learning model implemented by a particular leaf 622 may be an XGBoost Decision Tree that returns a probability of content upload (i.e. content upload probability rate) and a probability of return 622-1 for a respective user. The probability of return 620-1 represents a likelihood the respective user will return to access the content corpus as a result of being offered a non-subscription fee offer option. The Offer Engine calculates an average 510 of the probabilities of return 620-1, 622-1 to be further utilized as input for an objective function.

In some embodiments, each respective leaf at the third level 670 may include the same machine learning model. For example, each third level leaf may be an XGBoost Decision Tree for a different user segment. In some embodiments, the machine learning model(s) implemented at each leaf of the second level are based on a type of machine learning model(s) trained by the Offer Engine separately from the machine learning model(s) implemented at each leaf of the third level. It is understood that Offer Engine trains the type of machine learning model(s) implemented at each leaf of the third level as well.

In some embodiments, the machine learning model(s) implemented at each leaf of the second level 660 may be the same type of the machine learning model(s) implemented at each leaf of the third level, although trained separately with different training data. In some embodiments, the machine learning model(s) implemented at each second level leaf may be a different type of machine learning model(s) than those implemented at each third level leaf.

In various embodiments, each leaf may have one or more machine learning models that corresponds to a particular type of user segment. Each specific leaf's machine learning model may further be trained by the Offer Engine with training data for a particular user segment that represents a uniform distribution of treatment output based on samples of users for the particular user segment (i.e., subscription fee first offer option, non-subscription fee second offer option).

According to various embodiments, one or more features may be defined from the following: a "browser_avail_area" feature type which represents a number of pixels available for page content on a user screen, a "browser_avail_height" feature type which represents a number of vertical pixels available for page content on the user screen, a "browser_avail_width" feature type which represents a number of horizontal pixels available for page content on the user screen, a "browser_hardware_concurrency" feature type which represents a number of logical processors available to run threads on the requesting user's computer device, a "browser_make" feature type based on user data associated with a type of web browser used by a user to send a content request, a "browser_max_touch_points" feature type which represents a maximum number of simultaneous touch contact points supported by the requesting user's computer device, a "browser_orientation_reduced" feature type which represents whether and orientation of the screen of the requesting user's computer device is a vertical orientation or an horizontal orientation, a "browser_platform_reduced" feature type which represents an identification of a platform on which the requesting browser is running, a "browser_referrer_is" feature type which represents a requesting user is sending a request as a result of a referral from a web property of a particular $3^{rd}$ Party entity, a "browser_referrer_reduced" feature type which represents an identification of the particular $3^{rd}$ Party entity.

One or more features may also be defined from the following: a "collected_at_hour_of_day_utc" feature type based on user data associated with a time of day a user request is received, a "device_from_user_agent" feature type based on user data associated with a type of device from which the user's request is sent, a "device_from_user_agent_reduced" feature type which represents a device type associated a requesting user, a "device_with_version_from_user_agent" feature type which represents a type of device and a device version associated with a requesting user, a "document_age_in_seconds" feature type based on data associated with an age of content a user seeks to access, a "document_downloads_per_view" feature type based on data associated with a number of times content a user seeks to access has been previously downloaded in relation to a number of times the content has been viewed by other users, a "document_extension_reduced" feature type which represents a file extension of a document accessed by a requesting user, a "document_images_per_page" feature type based on data related to an amount of image content present in content a user seeks to access, a "document_language_id_reduced" feature type based on data related to a language of content a user seeks to access, a "document_pages" feature type based on data related to a number of pages of content a user seeks to access, a "document_primary_use_case_reduced" feature type which represents a representation of a primary use case document being accessed by the requesting user, a "document_ratings_per_view" feature type based on data related to ratings applied to content a user seeks to access from one or more respective views of the content by other users, a "document_ratings_up_rate" feature type which represents a rate of positive reviews of a document being accessed by a requesting user, a "document_upload_source_reduced" feature type which represents an identification of an acquisition method of a document being accessed by a requesting user.

One or more features may also be defined from the following: a "geo_continent_code" feature type based on user data associated with continent location of the user, a "geo_country_code" feature type based on user data associated with country location of the user, a "geo_latitude" feature type based on user data associated with a latitude of a user's geographical location, a "geo_longitude" feature type based on user data associated with a longitude of a user's geographical location.

One or more features may also be defined from the following: a "request_header_accept_encoding_reduced" feature type which represents a value of a requesting user's Accept-Encoding Hyper Text Transfer Protocol (HTTP) request header, a "request_header_accept_language_en" feature type which represents an indication whether a requesting user's Exact-Language HTTP request header contains English, a "request_header_accept_language_en_gb" feature type which represents an indication whether a requesting user's Exact-Language HTTP request header contains British English, a "request_header_accept_language_es" feature type which represents an indication whether a requesting user's Exact-Language HTTP request header contains Spanish a "request_header_accept_language_id" feature type which represents an indication whether a requesting user's Exact-Language HTTP request header contains Indonesian, a "request_header_accept_language_pt" feature type which represents an indication whether a requesting user's Exact-Language HTTP request header contains Portuguese, a "request_header_dnt" feature type which represents a value of the requesting user's Do Not Track (DNT) HTTP request header, a "request_header_upgrade_insecure_requests" feature type which represents a value of the requesting user's Upgrade-Insecure-Requests HTTP request header a "request_header_user_agent_platform" feature type which represents a requesting user's operating system as represented in their User-Agent HTTP request header, a "request_host_language_code" feature type which represents a subdomain of an online resource address of a webpage a requesting user is viewing, a "request_host_reduced" feature type which represents a domain of an online resource address of a webpage a requesting user is viewing.

One or more features may also be defined from the following: a "user_age_in_seconds_per_content_in_saved_list" feature type which represents an amount of time that has occurred since a requesting user created a user account divided by a number of distinct content portion in a content saving list of the user account, a "user_age_in_seconds_per_incentivized_upload" feature type which represents an amount of time that has occurred since a requesting user created a user account divided by a number of content portions a requesting user has uploaded in exchange for access to one or more portions of content in the content corpus, a "user_age_in_seconds_per_trial_subscription" feature type which represents an amount of time that has occurred since a requesting user created a user account divided by a number of previous trial subscriptions associated with a requesting user, a "user_age_in_seconds" feature type which represents an amount of time that has occurred since a requesting user created a user account, a "user_eligible_for_trial_subscription" feature type which represents whether a requesting user is eligible to begin a trial subscription, a "user_good_quality_incentivized_uploads_share" feature type which represents a share of content a requesting user uploaded which were determined to be of a good quality and a "user_incentivized_uploads_count" feature type which represents a an amount of content a requesting user uploaded in exchange for access to one or more portions of the content corpus.

Figure 7:
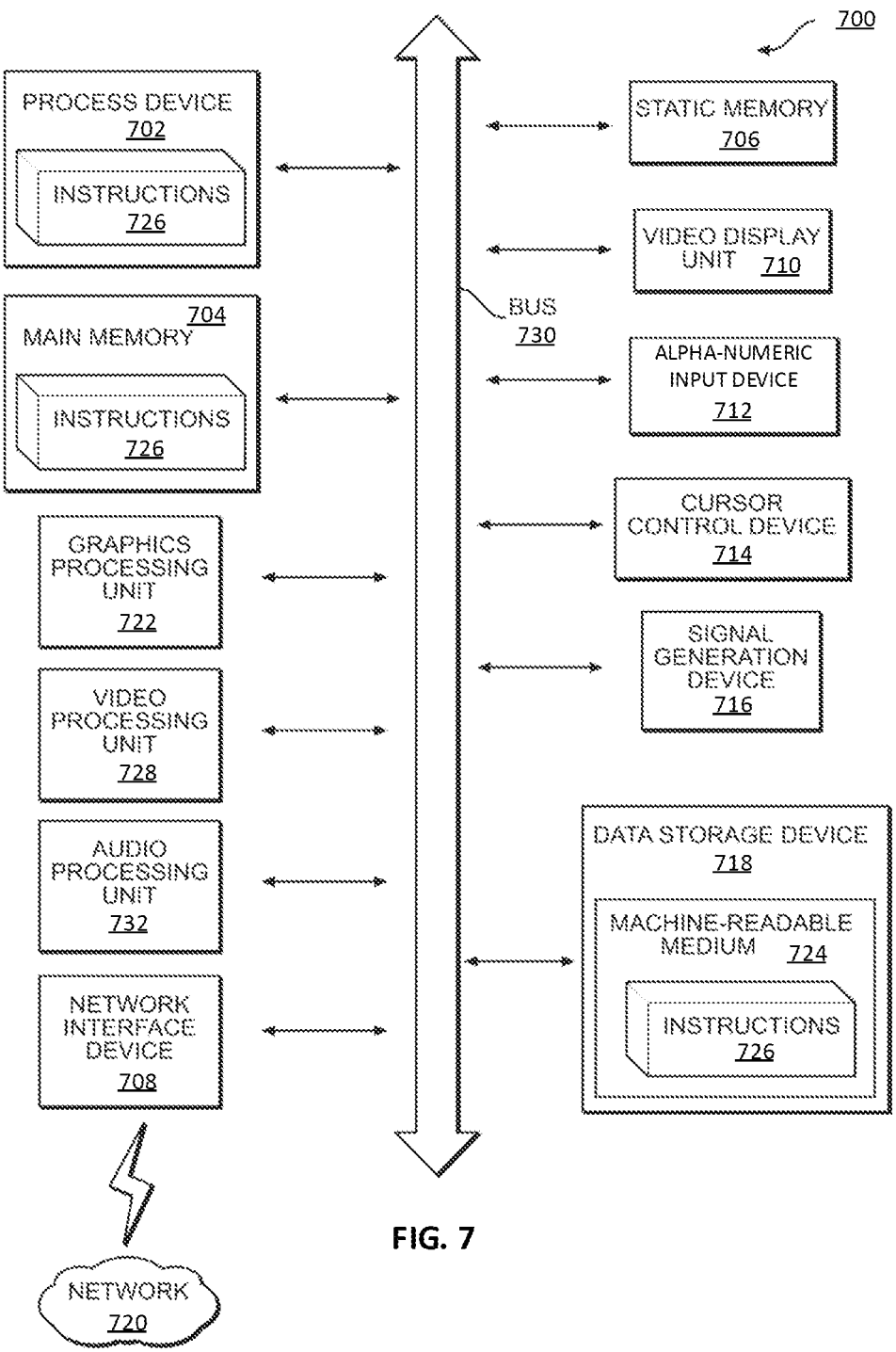
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   generating training data based on a uniform distribution of users sampled from a user segment;
   training respective machine learning models that correspond to leaves of a plurality of levels of a decision tree, each respective leaf associated with a corresponding confidence interval, the confidence interval representing an expected accuracy range of leaf output;
   extracting one or more features from request data associated with a first user requesting access to user content;
   feeding at least one of the features of the first user into the decision tree;
   identifying, at a first level of the decision tree, a user segment relevant to the first user due to one or more of the extracted features;
   identifying a relevant leaf, at a subsequent level of the decision tree below the first level, that corresponds the to the user segment relevant to the first user;
   generating, at the relevant leaf, output comprising:
      (a) a first prediction of receiving at least one subsequent content access request from the first user; and
      (b) a second prediction of acceptance of a first type of offer by the first user in exchange for granting the subsequent content access request;
   feeding the first and the second predictions to an additional leaf at a further subsequent level of the decision tree, the further subsequent level situated below the subsequent level of the relevant leaf;
   generating, at the additional leaf, output comprising:
      (i) a third prediction of receiving at least one content upload from the first user; and
      (ii) a fourth prediction of acceptance of a second type of offer by the first user in exchange for the at least one content upload;
   determining whether to provide the first user with the first type of offer or the second type of offer based on the respective output predictions and further based on the confidence intervals of the relevant leaf and the additional leaf.

2. The computer-implemented method of claim 1, wherein an extracted feature is based on an identification of an online source that referred the first user to send a content access request.

3. The computer-implemented method of claim 1, wherein an extracted feature is based on data associated with a number of previous downloads of the user content to which the first user seeks to access in relation to a number of times the user content has been viewed by other users.

4. The computer-implemented method of claim 1, wherein an additional extracted feature is based on data related to an amount of image content present in content to which the first user seeks access.

5. The computer-implemented method of claim 1, wherein an extracted feature is representative of an amount of time that has occurred since the first user created a first user account in relation to a number of distinct content portions in a saved content list of the first user account.

6. The computer-implemented method of claim 1, wherein an extracted feature is representative of a geographic location associated with the first user.

7. A system comprising one or more processors, and a non-transitory computer-readable medium including one or more sequences of instructions that, when executed by the one or more processors, cause the system to perform operations comprising:

generating training data based on a uniform distribution of users sampled from a user segment;

training respective machine learning models that correspond to leaves of a plurality of levels of a decision tree, each respective leaf associated with a corresponding confidence interval, the confidence interval representing an expected accuracy range of leaf output;

extracting one or more features from request data associated with a first user requesting access to user content;

feeding at least one of the features of the first user into the decision tree;

identifying, at a first level of the decision tree, a user segment relevant to the first user due to one or more of the extracted features;

identifying a relevant leaf, at a subsequent level of the decision tree below the first level, that corresponds the to the user segment relevant to the first user;

generating, at the relevant leaf, output comprising:
(a) a first prediction of receiving at least one subsequent content access request from the first user; and
(b) a second prediction of acceptance of a first type of offer by the first user in exchange for granting the subsequent content access request;

feeding the first and the second predictions to an additional leaf at a further subsequent level of the decision tree, the further subsequent level situated below the subsequent level of the relevant leaf;

generating, at the additional leaf, output comprising:
(i) a third prediction of receiving at least one content upload from the first user; and
(ii) a fourth prediction of acceptance of a second type of offer by the first user in exchange for the at least one content upload;

determining whether to provide the first user with the first type of offer or the second type of offer based on the respective output predictions and further based on the confidence intervals of the relevant leaf and the additional leaf.

8. The system of claim 7, wherein an extracted feature is based on an identification of an online source that referred the first user to send a content access request.

9. The system of claim 7, wherein an extracted feature is based on data associated with a number of previous downloads of the user content to which the first user seeks to access in relation to a number of times the user content has been viewed by other users.

10. The system of claim 7, wherein an additional extracted feature is based on data related to an amount of image content present in content to which the first user seeks access.

11. The system of claim 7, wherein an extracted feature is representative of an amount of time that has occurred since the first user created a first user account in relation to a number of distinct content portions in a saved content list of the first user account.

12. The system of claim 7, wherein an extracted feature is representative of a geographic location associated with the first user.

13. A computer program product comprising a non-transitory computer-readable medium having a computer-readable program code embodied therein to be executed by one or more processors, the program code including instructions for:

generating training data based on a uniform distribution of users sampled from a user segment;

training respective machine learning models that correspond to leaves of a plurality of levels of a decision tree, each respective leaf associated with a corresponding confidence interval, the confidence interval representing an expected accuracy range of leaf output;

extracting one or more features from request data associated with a first user requesting access to user content;

feeding at least one of the features of the first user into the decision tree;

identifying, at a first level of the decision tree, a user segment relevant to the first user due to one or more of the extracted features;

identifying a relevant leaf, at a subsequent level of the decision tree below the first level, that corresponds the to the user segment relevant to the first user;

generating, at the relevant leaf, output comprising:
(a) a first prediction of receiving at least one subsequent content access request from the first user; and
(b) a second prediction of acceptance of a first type of offer by the first user in exchange for granting the subsequent content access request;

feeding the first and the second predictions to an additional leaf at a further subsequent level of the decision tree, the further subsequent level situated below the subsequent level of the relevant leaf;

generating, at the additional leaf, output comprising:
(i) a third prediction of receiving at least one content upload from the first user; and
(ii) a fourth prediction of acceptance of a second type of offer by the first user in exchange for the at least one content upload;

determining whether to provide the first user with the first type of offer or the second type of offer based on the respective output predictions and further based on the confidence intervals of the relevant leaf and the additional leaf.

14. The computer program product of claim 13, wherein an extracted feature is based on an identification of an online source that referred the first user to send a content access request.

15. The computer program product of claim 13, wherein an extracted feature is based on data associated with a number of previous downloads of the user content to which the first user seeks to access in relation to a number of times the user content has been viewed by other users.

16. The computer program product of claim 13, wherein an additional extracted feature is based on data related to an amount of image content present in content to which the first user seeks access.

17. The computer program product of claim 13, wherein an extracted feature is representative of an amount of time that has occurred since the first user created a first user account in relation to a number of distinct content portions in a saved content list of the first user account.

* * * * *